D. BYRD.
CORN HARVESTER.
APPLICATION FILED APR. 19, 1919.
1,357,145.
Patented Oct. 26, 1920.
3 SHEETS—SHEET 2.
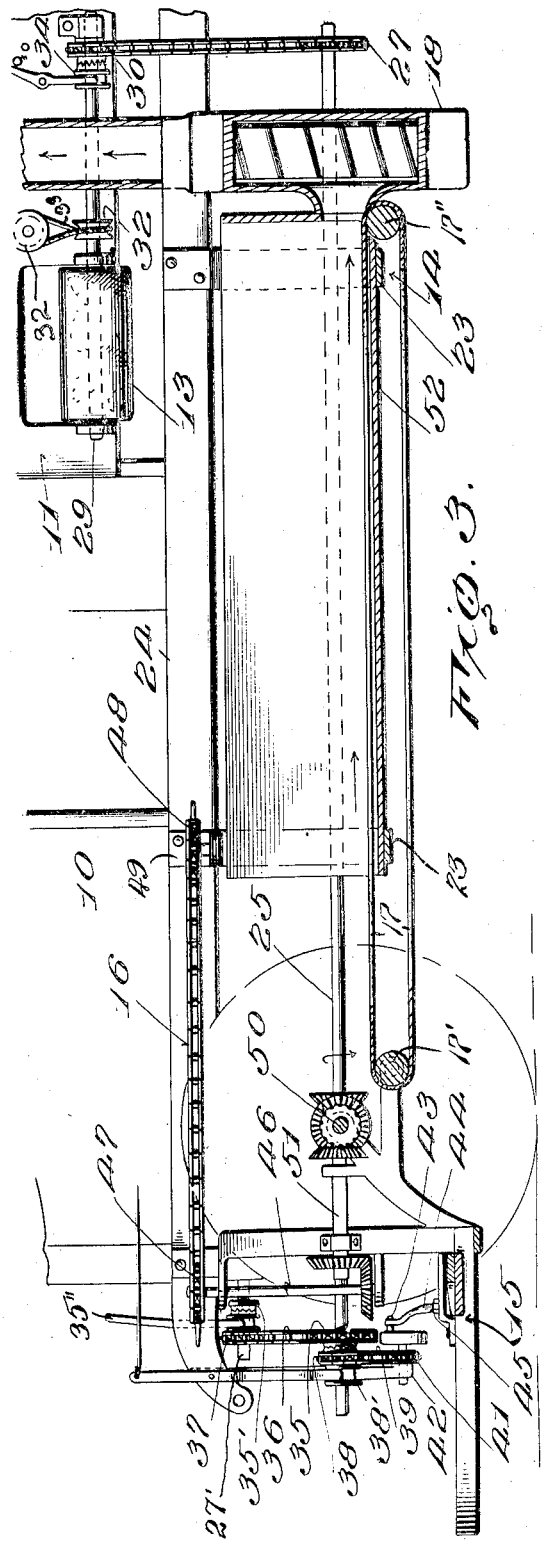
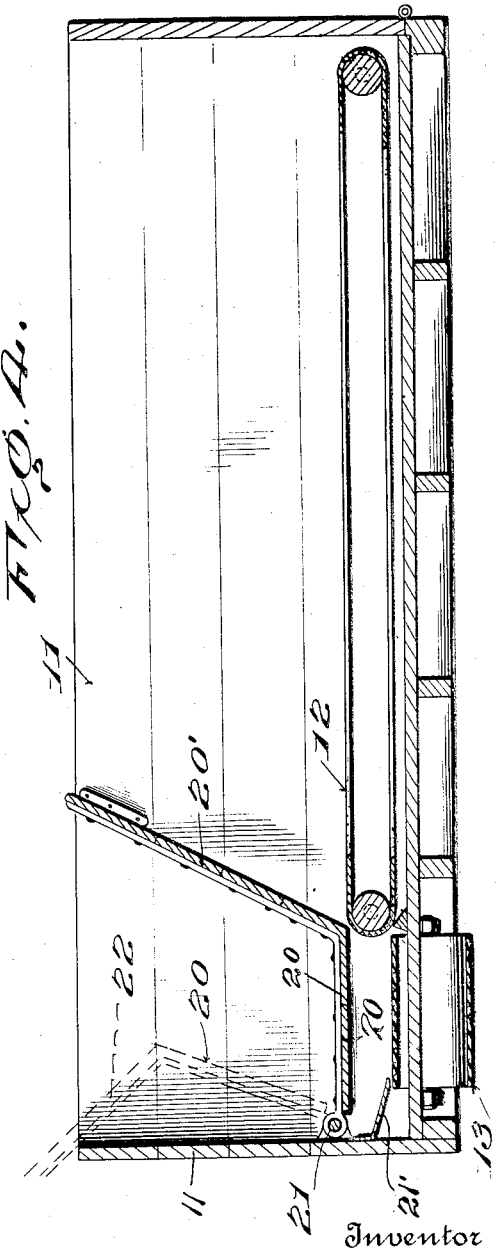
Inventor
Don Byrd.
By
Attorneys

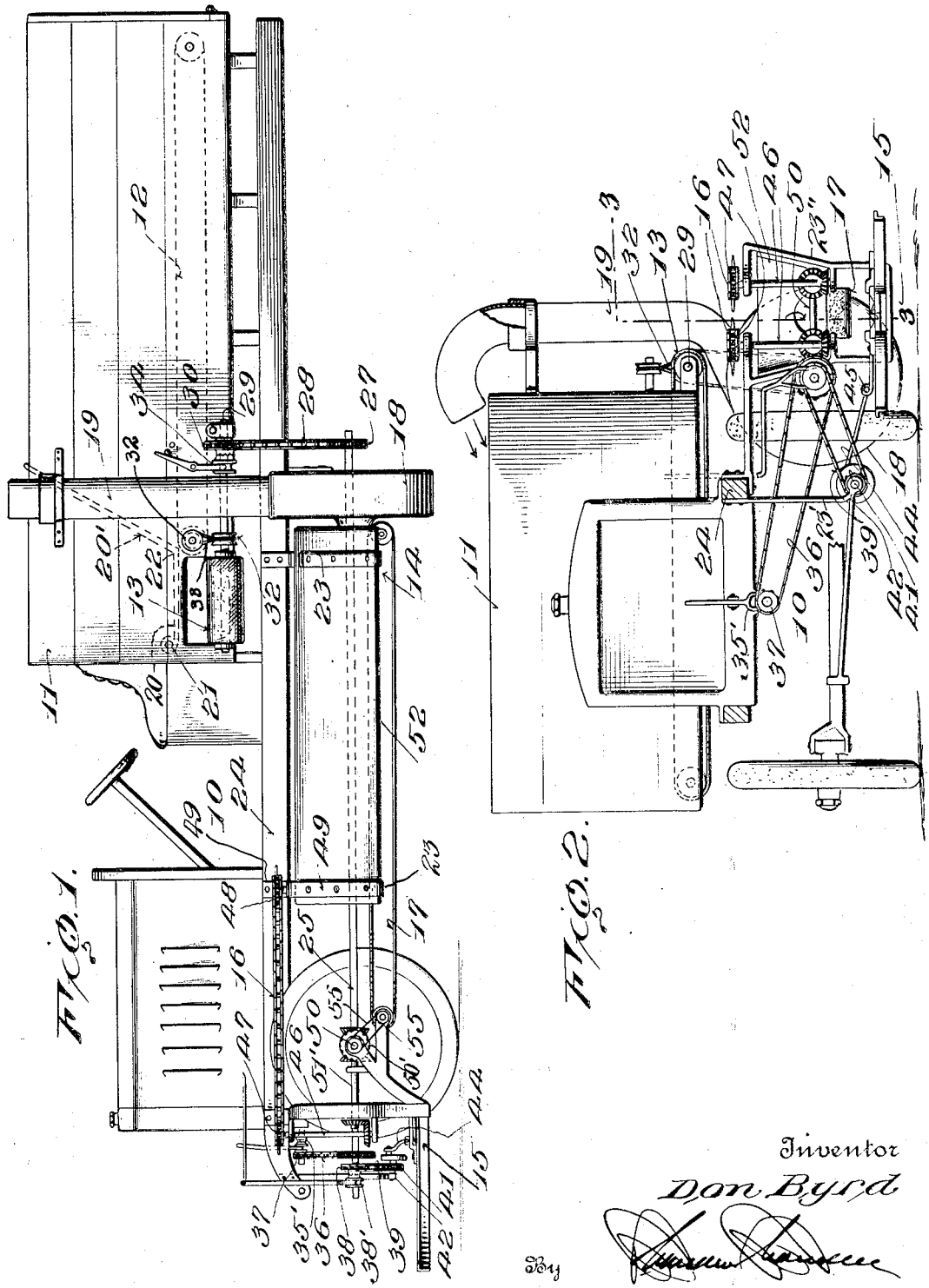

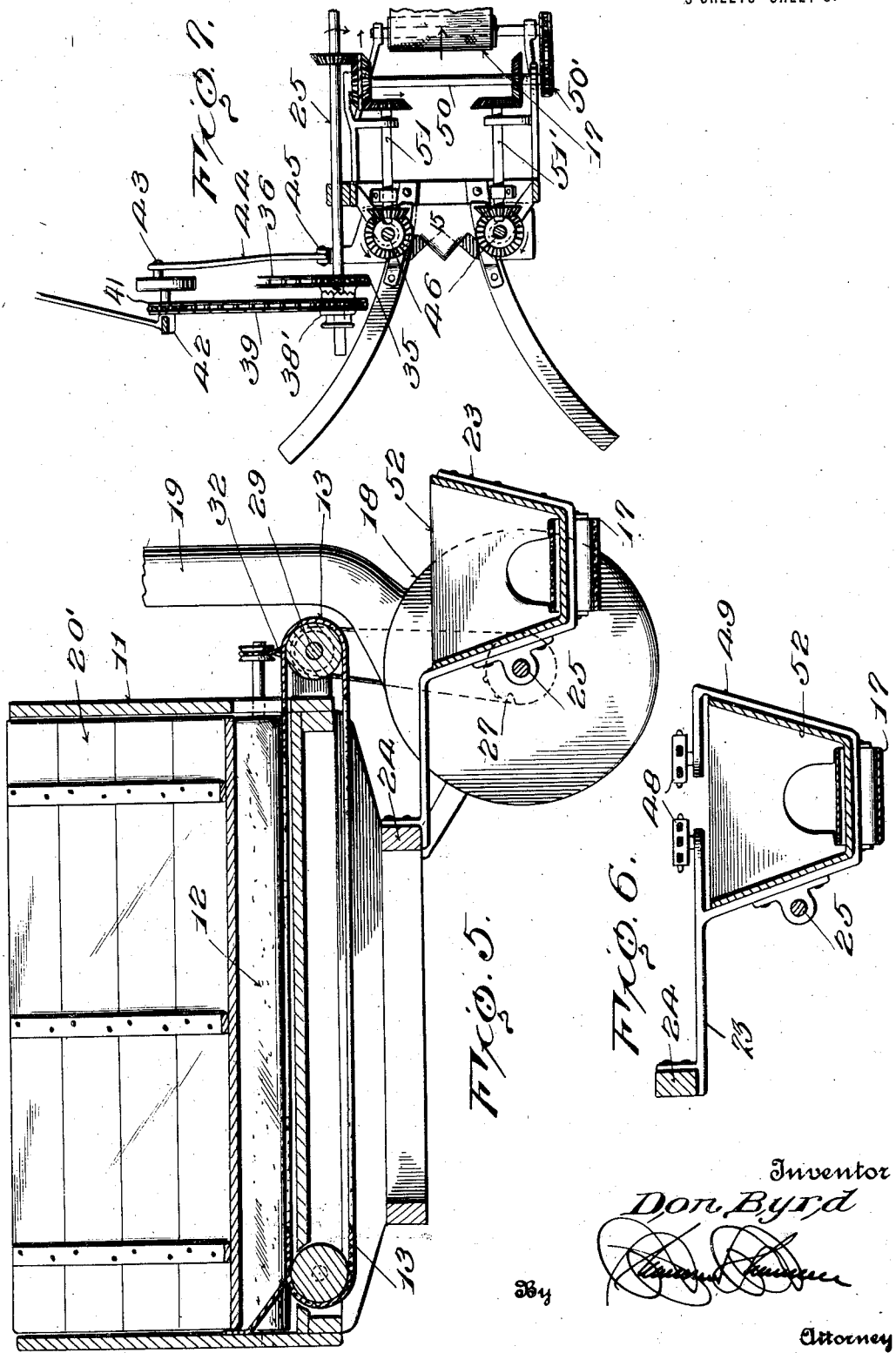

UNITED STATES PATENT OFFICE.

DON BYRD, OF FRANKLIN, WEST VIRGINIA.

CORN-HARVESTER.

1,357,145.

Specification of Letters Patent.

Patented Oct. 26, 1920.

Application filed April 19, 1919. Serial No. 291,358.

*To all whom it may concern:*

Be it known that I, DON BYRD, a citizen of the United States, residing at Franklin, in the county of Pendleton, State of West Virginia, have invented certain new and useful Improvements in Corn-Harvesters; and I do hereby declare the following to be a full, clear, and exact description of the invention, such as will enable others skilled in the art to which it appertains to make and use the same.

This invention relates to farm machinery, and more particularly to harvesting mechanism. It has especial relation, also, to a combined corn harvester and ensilage cutter, and has for its object to provide mechanism in the nature of an attachment for motor trucks, by means of which standing corn stalks may be cut, and by means of which also the cut stalks will be transferred to an ensilage cutter, from which the ensilage will be conveyed to the truck body.

Another and most important object of the invention is to provide a structure having the just stated characteristics which will include a combined cutting and conveying mechanism, and which will include, also, means for conveying the ensilage from the vehicle body again to the cutter and conveyer, the structure being such that this second introduction of ensilage to the cutter and conveyer may be brought about at any desired time.

The just stated characteristics of the present invention thus make it possible to cut standing corn stalks converting them into ensilage which is stored in the vehicle body; to then drive the vehicle to the silo in which the ensilage is to be stored, and then to transfer the ensilage from the vehicle body a second time to the cutter and conveyer, by means of which the ensilage may be transferred to the silo.

The present structure, as illustrated in the accompanying drawings, has been designed to include the use of a pneumatic cutter and conveyer, in which the rotor of the cutter constitutes a fan which forces the cut product out from the casing by pneumatic action.

From the foregoing it will be seen that the present invention has two principal objects; to provide a mechanism which may be attached to and incorporated in a motor truck of commercial design, and by means of which standing corn may be harvested and converted into ensilage; and to include in the mechanism a single cutting and conveying apparatus to which the cut ensilage may be introduced for a second time for the conveyance of the ensilage to a silo.

In the drawings:

Figure 1 is a side elevation of a motor truck with the present invention applied thereto.

Fig. 2 is a front elevation.

Fig. 3 is a longitudinal section taken on line 3—3 of Fig. 2, centrally between the stalk guides, and longitudinally of the stalk conveyer belt, parts being in elevation.

Fig. 4 is a longitudinal section through the vehicle body.

Fig. 5 is a transverse section through the complete mechanism and the truck taken longitudinally of the transverse ensilage conveyer.

Fig. 6 is a transverse section through the attachment in the plane of the rearward drag chain sprockets.

Fig. 7 is a detail view of the mechanism.

Referring to the drawings, there will be first described the general construction and operation of the mechanism.

There is shown a motor truck indicated generally by the character 10, the body 11 of which is provided with a bottom which is in the form of a longitudinally movable conveyer 12. This conveyer terminates short of the forward end of the body, where it is adapted to discharge upon a transversely arranged conveyer 13 discharging at one side of the vehicle. These portions, including the body, are designed to be substituted for the usual truck body when the truck is to be used in connection with the present invention.

The harvesting, preliminary conveying and cutting mechanism is embodied in an attachment indicated generally by the character 14, and includes means indicated at 15 for cutting the standing corn stalks, drag chains indicated at 16 for moving the stalks rearwardly; a horizontal rearwardly movable stalk conveyer 17 disposed to receive thereupon stalks released by the chains 16; and a combined ensilage cutter and blower 18 located at the rearward end of the conveyer 17 to receive stalks therefrom. The discharge pipe 19 of the cutter and blower is arranged to be shifted to different positions as is usual in such devices, and may be disposed to discharge ensilage from the cutter and blower into the vehicle body and upon the conveyer 12. The conveyer 17 is so located as to lie with its rearward portion beneath the discharge end of the transverse conveyer 13, as shown.

As will be later described, means is provided for driving the mechanism from the motor of the vehicle. Thus, when the vehicle is driven through standing corn, the stalks are cut and transferred to the cutter and blower 18, from which ensilage is discharged into the vehicle body. When the body is completely filled, the vehicle may be driven to a silo and the discharge pipe of the blower and cutter arranged to discharge into the silo. The conveyers 12 and 13, together with the conveyer 17 are then set in motion independently of the harvesting cutter, when the ensilage within the vehicle body and upon the conveyer 12 will be discharged therefrom upon the conveyer 13 and, in turn, discharged from the conveyer 13 to the conveyer 17, by which it is introduced to the cutter and blower 18 and discharged therefrom through the pipe 19 into the silo.

By this complete mechanism, there is provided a structure in which the corn is harvested, transformed into ensilage and deposited in the silo without the necessity of manual operations, other than those necessary in operating the mechanism, the use of the present invention thus doing away with the services of many farm hands ordinarily required in performing these same operations.

A packing gate is provided at the discharge end of the conveyer 12 which is at the forward end of the body 11, this packing gate comprising a lower member 20 which is hinged at its forward end upon a transverse rod 21, and which portion 20 is in horizontal position at the time the body is being loaded, and extends rearwardly to the discharge portion of the conveyer 12. The gate includes also a second portion 20' that extends upwardly at an obtuse angle to the portion 20 and normally overhangs the conveyer belt 12. The ensilage delivered into the vehicle body upon the conveyer 12 is packed against this slanting portion 20' of the gate and when the ensilage is to be discharged from the conveyer 12 onto the conveyer 13, the gate is raised to the position shown in dotted lines in Fig. 4 of the drawings, when the portion 20' moves away from the load on the conveyer 12 and the portion 20 moves upwardly from its position covering the conveyer 13. The load of ensilage that is then carried by the conveyer 12 over the conveyer 13, is deflected by the then slanting portion 20 of the gate, onto the conveyer 13.

It will be apparent that when the gate is in the tilted position shown in dotted lines in Fig. 4, the discharge of material against it for deflection by it on the conveyer 13, will serve to hold the gate in such position, the gate gradually resuming its full line position illustrated, as the quantity of material in the body 11 diminishes. Should the gate at any time tend to cut off the flow, it may be held by hand or in any other desired manner.

To prevent passage of ensilage beyond and below the conveyer 13, a supplemental deflector 21' is secured to the end of the body 11 as illustrated in Fig. 4.

The attachment 14 is supported by a plurality of downwardly and outwardly extending brackets 23 and 23', secured to one side of the chassis frame of the vehicle, indicated at 24, and these brackets support a main power shaft 25 which extends longitudinally. At the rearward end of this shaft is the rotor of the cutter and blower 18, the latter being held in position by suitable fastenings as illustrated.

The rotor shaft 25 is carried rearwardly beyond the blower casing, where it carries a sprocket 27 from which a chain 28 drives the shaft 29 mounted in the vehicle body. This shaft drives the conveyer 13, and the shaft 29 through the medium of pulleys 32 and a belt 33 drives the conveyer 12. A clutch indicated at 34 is provided, by means of which the shaft 29 may be disconnected from its driven connection with the shaft 25.

The forward end of the shaft 25 carries a sprocket 35, and this sprocket 35 is driven by a chain 36 engaged with a sprocket 37 carried by the motor shaft 27' of the vehicle.

The sprocket wheel 37 carries one member of a clutch which is shifted into and out of engagement with the second member of the clutch 35', through the medium of the shift lever 35''. It is of course understood that the sprocket wheel 37 and its clutch member are normally loose on the shaft 27', while the second member of the clutch 35' is fixed to the shaft 27'. This is a conversional construction however and well understood by those skilled in the art.

The shaft 25 carries also a sprocket 38 at its forward end between which and the shaft 25 there is a clutch 38', and this sprocket 38 drives a chain 39 which, in turn, drives a sprocket 41 suitably journaled in a bracket 42 properly braced and supported as shown. The sprocket 41 carries a disk which, in turn, carries an eccentric pin 43 with which there is engaged a pitman 44 connected with the cutter indicated at 45 for reciprocation thereof. This cutter constitutes a part of the cutting mechanism indicated at 15.

Vertical shafts 46, suitably mounted and supported, carry at their upper ends the sprockets 47 of the drag chains 16, the rearward sprockets 48 of these drag chains being supported upon a special bracket 49 carried by one of the brackets 23.

A bevel gear connection drives the inner shaft 46 from the shaft 25, and this shaft 46, through the medium of a shaft 51 connected therewith by bevel gears, drives a transverse shaft 50 which, in turn, drives a shaft 51' similar to the shaft 51, geared to the other vertical shaft 46.

At the outer side of the shaft 25 and directly adjacent thereto is the longitudinally extending trough 52, the sides of which converge downwardly, this trough being supported in a pair of brackets 23. The trough has openings in its ends through which passes one flight of the endless conveyer belt 17 mounted upon rollers 17' and 17", the former at the forward end of the apparatus being provided with a sprocket wheel 55 with which engages a sprocket chain 55' that extends to a sprocket wheel 50' on the shaft 50.

From the foregoing, it will be seen that by reason of the provision of the various clutches referred to, the vehicle may be operated with the entire mechanism stationary; the cutting mechanism 15 and the conveyer 17 may be operated while the conveyers 12 and 13 remain stationary; or the conveyer 17 and the conveyers 12 and 13 may be operated while the cutting mechanism 15 remains stationary. Since the cutter and blower 18 is carried directly by the shaft 25, it, of course, operates at all times except when the clutch 35' is disengaged, the conveyer 17 operating also.

What is claimed is:

1. The combination with a vehicle having a storage compartment, of means carried by the vehicle for harvesting a standing crop, means for treating the crop after it is harvested, means for conveying and delivering the treated crop from the treating means to the storage compartment of the vehicle, said conveying and delivering means being also arranged to convey and deliver the treated crop at times exterior to said storage compartment, and means for conveying treated crop stored within the storage compartment of the vehicle again to the treating means.

2. The cmobination with a vehicle having a storage compartment, of means carried by the vehicle for harvesting a standing crop, means for treating the crop after it is harvested, means for conveying and delivering the treated crop from the treating means to the storage compartment of the vehicle, said conveying and delivering means being also arranged to convey the treated crop at times exterior to the storage compartment, and means for conveying and delivering treated crop stored within the storage compartment of the vehicle again to the treating means, the last named conveying means and the harvesting means being operable independently of each other.

3. The combination with a vehicle having a storage compartment, of a conveyer bottom in the storage compartment movable to discharge material therefrom, a second conveyer disposed to receive material from the first conveyer and movable to discharge material therefrom, an ensilage cutter carried by the vehicle, means for introducing material to the cutter, and means for conveying cut material from the cutter to the storage compartment of the vehicle, said last named conveying means being arranged also to convey cut material and deliver it exterior to said storage compartment at times, said means for introducing material to the cutter being located to receive from the second conveyer.

4. The combination with a vehicle having a storage compartment, of a conveyer bottom in the storage compartment movable to discharge material therefrom, a second conveyer disposed to receive material from the first conveyer and movable to discharge material therefrom, an ensilage cutter carried by the vehicle, means for introducing material to the cutter, and means for conveying cut material from the cutter to the storage compartment of the vehicle, said last named conveying means being arranged also to convey cut material exterior to the storage compartment at times, said means for introducing material to the cutter being located to receive from the second conveyer, said cutter and the introducing means being operable independently of the conveyers.

5. A corn harvesting and ensilage cutting mechanism including corn harvesting means, an ensilage cutter, means for conveying corn from the harvesting means to the ensilage cutter, means for storing ensilage, means for conveying ensilage from the cutter to the storing means, said last named conveying means being arranged to convey ensilage at times exterior to the storage compartment, and means arranged for operation at times and to remain at times inactive for conveying ensilage from the storing means to position for reintroduction to the means for conveying ensilage to the cutter.

6. The combination with a vehicle of brackets carried by the vehicle, a trough carried by the brackets, a shaft journaled upon the brackets, an ensilage cutter connected with the shaft for actuation through rotation of the shaft and lying at one end of the trough, means for moving corn through the trough, means for cutting standing corn located at the opposite end of the trough from the cutter, driving connections between the shaft and the second mentioned cutting means and means for rotating the shaft.

In testimony whereof, I affix my signature in the presence of two witnesses.

DON BYRD.

Witnesses:
H. ELLIS CHANDLER,
S. K. W. EINSTEIN.